United States Patent [19]

Levinson

[11] Patent Number: 4,927,225
[45] Date of Patent: May 22, 1990

[54] 2×2 OPTICAL BYPASS SWITCH

[75] Inventor: Frank H. Levinson, Redwood City, Calif.

[73] Assignee: Finisar Corporation, Menlo Park, Calif.

[21] Appl. No.: 358,892

[22] Filed: May 30, 1989

[51] Int. Cl.$^5$ ................................................ G02B 6/32
[52] U.S. Cl. ............................... 350/96.18; 350/96.16; 350/96.20
[58] Field of Search ............... 350/96.13, 96.15, 96.16, 350/96.18, 96.19, 96.20, 96.21, 96.22

[56] References Cited

U.S. PATENT DOCUMENTS

| 4,239,330 | 12/1980 | Ashkin et al. | 350/96.18 |
| 4,265,513 | 5/1981 | Matsushita et al. | 350/96.20 |
| 4,304,460 | 12/1981 | Tanaka et al. | 350/96.16 |
| 4,626,066 | 12/1986 | Levinson | 350/96.18 |

FOREIGN PATENT DOCUMENTS

| 54-102135 | 8/1979 | Japan | 350/96.20 |
| 54-106245 | 8/1979 | Japan | 350/96.20 |
| 54-161346 | 12/1979 | Japan | 350/96.15 |
| 57-186704 | 11/1982 | Japan | 350/96.13 |

Primary Examiner—John D. Lee
Attorney, Agent, or Firm—Flehr, Hohbach, Test, Albritton & Herbert

[57] ABSTRACT

An optical switch channels incoming light to selected transmission elements. The switch includes a GRIN lens having two opposite surfaces, one of which has a mirror coating applied to it. At least four optical transmission elements, typically optical fibers, are connected to the non-mirrored surface of the lens. When used in an optical signal networking application, one of the four transmission elements couples the switch to a node's receiver and another couples the switch to a node's transmitter. The remaining two transmission elements, called in the input line and the output line, attach the node to the network and thereby conduct light from the previous node to the device or conduct light from the device to the next node on the network. The transmission elements and the lens element move with respect to each other into one of two possible states, called the bypass and active states. In the bypass state, the input line is coupled to the output line so that light from the previous node in the network is transmitted onto the next node, and the node's receiving line is coupled to the node's transmission line so that light from the node transmitter is transmitted back to the node's receiver. In the active state, the switch couples light arriving on the input line, from the previous node, to the node's receiver while simultaneously coupling the node's transmitter to the output line, which carries signals to the next node in the network.

12 Claims, 5 Drawing Sheets

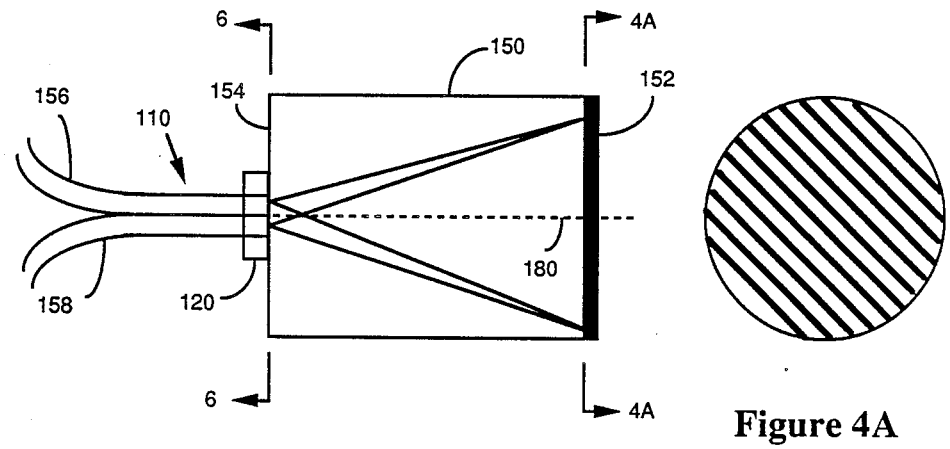
Figure 4
Figure 4A
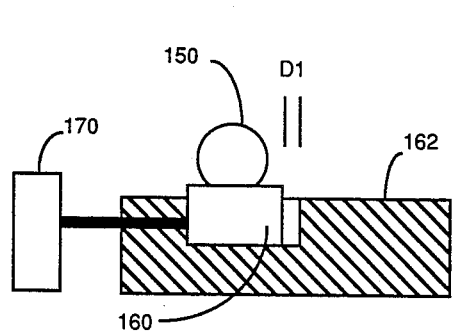
Figure 5
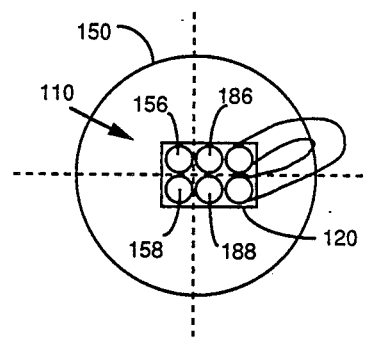
Figure 6
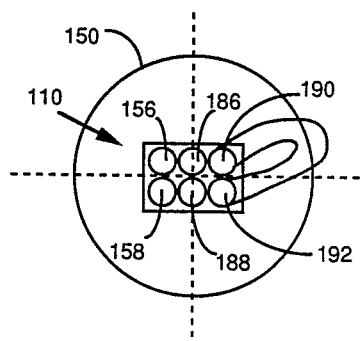
Figure 7
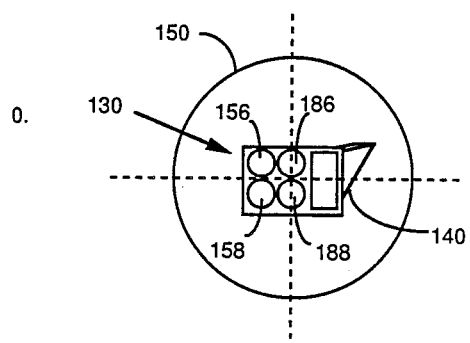
Figure 8

2×2 OPTICAL BYPASS SWITCH

This invention relates to optical communications systems and in particular to optical fiber circuit elements which couple light from one set of optical fibers to a second set of optical fibers and which can change the coupling paths under electrical control.

BACKGROUND OF THE INVENTION

In optical communication systems, the need exists for a variety of coupling devices where light signals can be switched among various transmission elements. For example, 1×2 and non-blocking 2×2 optical switches can be used in a variety of networking applications. In ring networks, the requirement is to be able to have a node (e.g., a host computer) either participate in the network or be bypassed. This bypass function is required so that a particular node is decoupled from the network in the event of a malfunction. Bypass is also used for self testing before a node connects to the network. More specifically, in the bypass condition the node needs to be able to have its transmitter talk to its own receiver to verify that it is operating correctly before being reconnected to the network. This condition is termed local loopback.

At least one proposal has been made for a multiport coupler using a graded index of refraction (GRIN) lens. In U.S. Pat. No. 4,304,460, issued to Tanaka, et. al., an array of fibers is coupled to one surface of the lens and a rotatably mounted mirror is provided at the other surface. Incoming light is diverted from one fiber to another by means of rotating the mirror. While adequate, the need for a motor to rotate the element adds complexity and cost to the coupler and may decrease reliability under prolonged use in the field. An alternate proposal was made by Levinson in U.S. Pat. No. 4,626,066, where the rotating mirror was replaced by a cantilevered arm etched into a piece of silicon. The micromachined cantilevered mirror appears attractive for ease of manufacturing but the part may be difficult to align to the fiber array on the other end of the GRIN lens and hence may result in inferior performance.

It is the object of the present invention to provide a compact, low cost 2×2 non-blocking switch which can channel light among various transmission elements in a controlled manner.

SUMMARY OF THE INVENTION

In summary, the present invention is an optical switch which channels incoming light to selected transmission elements. The switch includes a GRIN lens having two opposite surfaces, one of which has a mirror coating applied to it. At least four optical transmission elements, which are typically optical fibers, are connected to the non-mirrored surface of the lens. When used in an optical signal networking application, one of the four transmission elements couples the switch to a node's receiver and another couples the switch to a node's transmitter. The remaining two transmission elements, called in the input line and the output line, attach the node to the network and thereby conduct light from the previous node to the device and conduct light from the device to the next node on the network.

The transmission elements and the lens element move with respect to each other into one of two possible states, called the bypass and active states. In the bypass state, the input line is coupled to the output line so that light from the previous node in the network is transmitted to the next node, and the node's receiving line is coupled to the node's transmission line so that light from the node's transmitter is transmitted back to the node's receiver. In the active state, the switch couples light arriving on the input line, from the previous node, to the node's receiver while simultaneously coupling the node's transmitter to the output line, which carries signals to the next node in the network.

BRIEF DESCRIPTION OF THE DRAWINGS

Additional objects and features of the invention will be more readily apparent from the following detailed description and appended claims when taken in conjunction with the drawings, in which:

FIGS. 4 and 4A depict the lens used in an optical switch in accordance with the present invention.

FIG. 5 depicts an actuator for moving the lens shown in FIG. 4 between two positions.

FIG. 6 shows a six-fiber array positioned with respect to a lens for coupling a node to an optical network.

FIG. 7 shows a six-fiber array positioned with respect to a lens for bypassing a node in an optical network.

FIG. 8 shows a four-fiber array with a right angle prism positioned with respect to a lens for bypassing a node in an optical network.

DESCRIPTION OF THE PREFERRED EMBODIMENTS

Figure 1A:
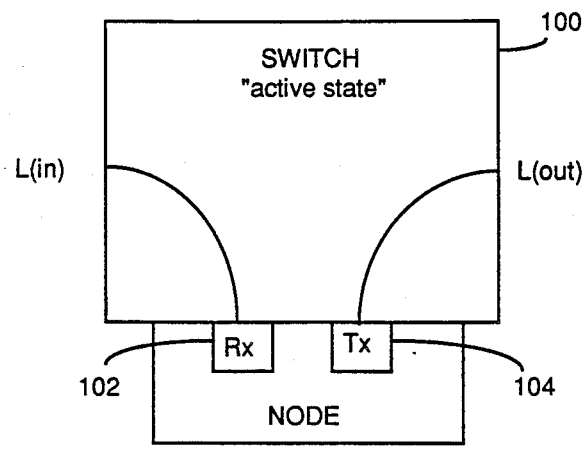
FIGS. 1A and 1B schematically represent two states of an optical switch.
Figure 1B:
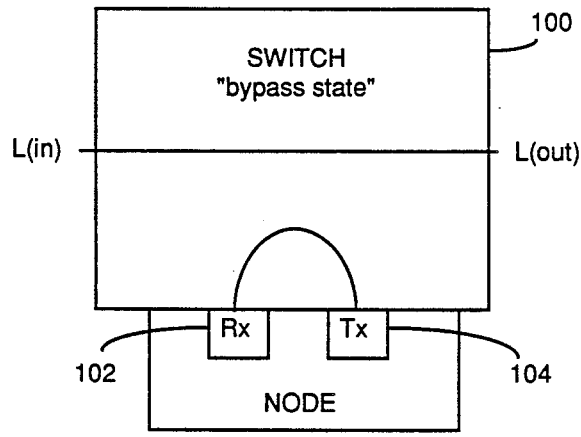

FIGS. 1A and 1B illustrate schematically the two states of the optical switch. In the active state, shown in FIG. 1A, light from a preceding node on the network is coupled to the port labeled L(in). The switch 100 then transmits this incoming light to port Rx, which is coupled to a node's receiver 102. In similar fashion, light emanating from the node's transmitter 104 is coupled to port Tx and in turn the switch couples port Tx to port L(out) which is typically connected to a transmission element whose destination is the next node in the network.

In FIG. 1B, the switch 100 is shown in the bypass state where light from the L(in) port is coupled to the L(out) port and light from the Tx port is coupled to the Rx port. The latter connection (from Tx to Rx) is not provided by some optical switches, but is useful in allowing the node to talk to itself and thereby verify that it is working properly before changing states and joining itself to the network.

Figure 2:
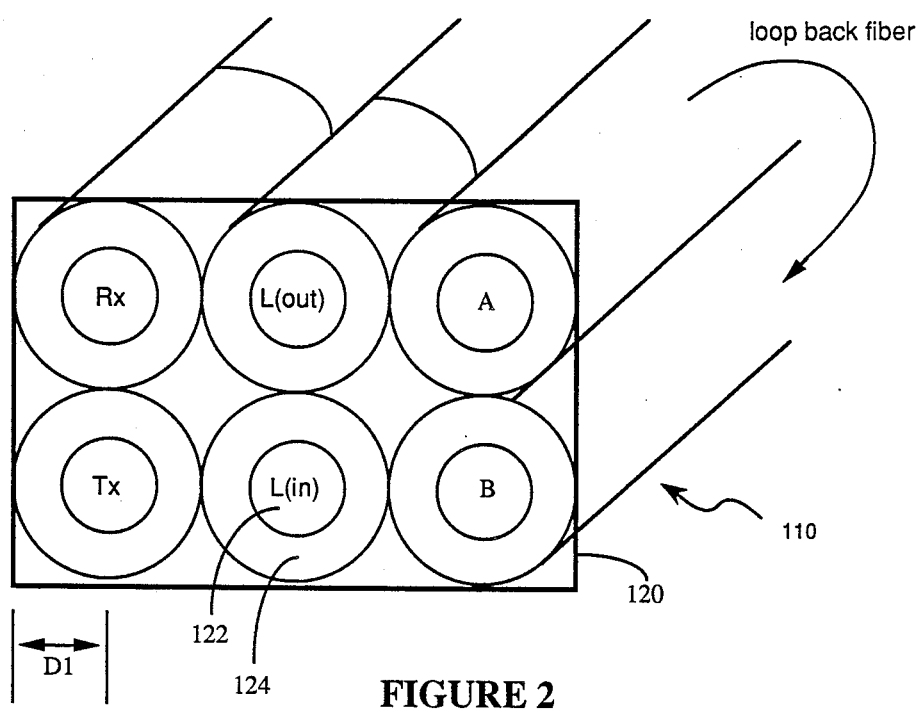
FIG. 2 depicts a six fiber array used in a preferred embodiment of the present invention.

In order to understand the construction of the switch 100, a description of the fiber input array is first required. FIG. 2 shows one possible fiber array 110 for the switch 100. There are six fiber ends arranged in a rectangular holder 120. The fibers utilized in the switch have a glass core 122 and a glass cladding 124. The diameter of the cladding is typically 125 μm while the diameter of the core is typically 62.5 μm. Such fibers typically have a graded index core and are referred to as multimode fibers. Note that the switch configuration shown herein is also valid for single mode fibers, which typically have a core size of 8 to 10 μm.

The four ports of the switch are labeled in the same way as in FIGS. 1A and 1B. The remaining two fiber ends, labelled A and B, are actually two ends of the same fiber looped back onto itself. Therefore light entering fiber end A will emerge from fiber end B, and vice versa. One half the width of a fiber, including its cladding, is labelled D1 for reasons that will be explained below.

Figure 3A:
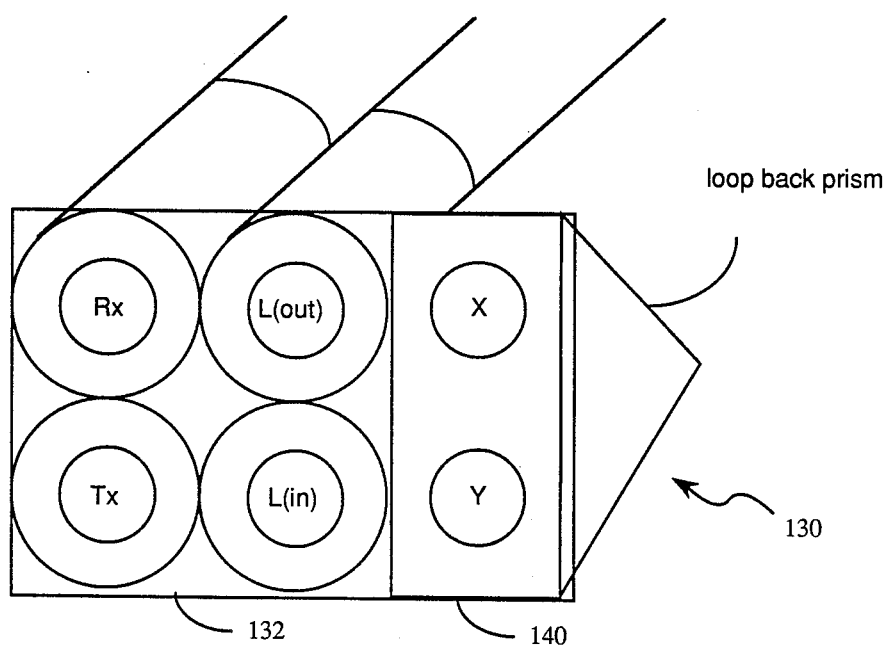
FIG. 3A depicts a four fiber array with a right angle prism.

FIG. 3A shows an alternate fiber array 130 used in a second embodiment of the invention. This fiber array uses a set of four fibers 132, plus a right angle prism 140 in place of the loop back fiber A-B. The long face of the prism is positioned to be coplanar with the fiber faces and the other two faces of the prism are coated with a mirror surface to cause light entering signal input region X of the long face to be reflected back to signal output area Y, and vice versa. A switch using this input array 130 operates in the same way as the switch based on the input array 110 in FIG. 2.

Figures 3B, 3C:
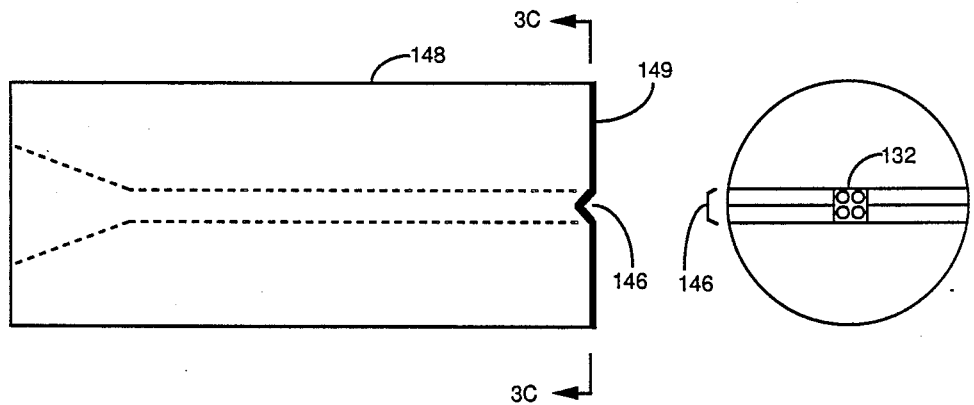
FIGS. 3B, 3C and 3D depict a four fiber array using a different right angle prism from the one shown in FIG. 3A.
Figure 3D:
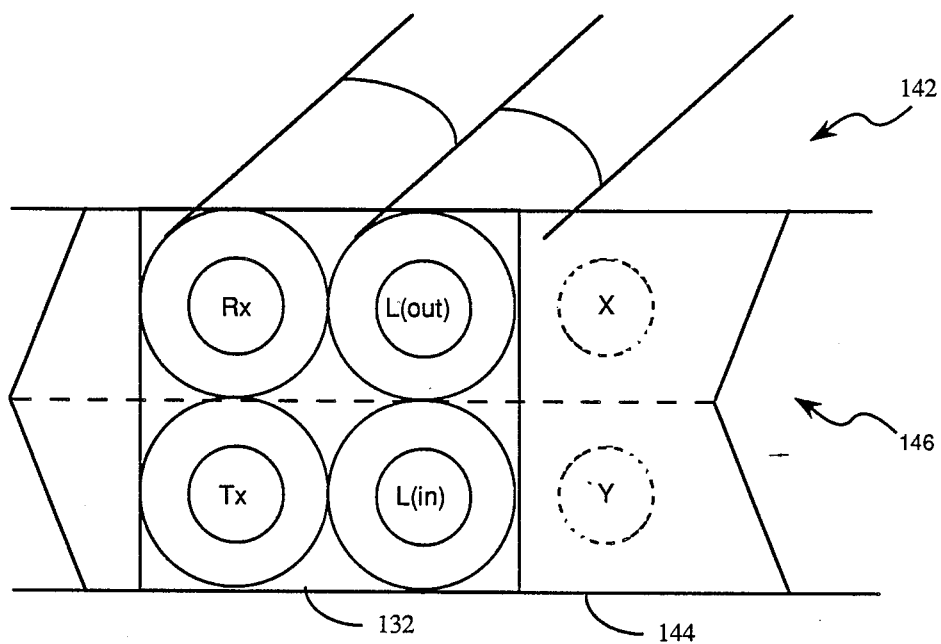

FIGS. 3B, 3C and 3D show another fiber array 142 which uses a right angle prism 144 formed by cutting a right-angle groove 146 from the end face of a capillary tube 148. The right-angle groove is then coated with a reflecting material to form a loop-back path. The capillary tube 148 has a bore which holds a set of four fibers 132. The fibers are cut and aligned so as to be coplanar with the end 149 of the capillary tube 148.

FIG. 4 shows a GRIN lens 150 which is nominally ¼ pitch in length and has a reflective surface 152 on one endface. Typically a 1.8 mm diameter GRIN lens is used. The mirror surface 152 is achieved either by cementing a front surface mirror onto the lens or by coating the lens endface with an appropriate substance like aluminum or gold. The lens 150 abuts the optical array 110 or 130, and reflects light emanating from any position on the interface surface 154 to a position on the opposite side and equally far from the lens axis 180. Thus light from fiber 156 is reflected into fiber 188.

FIG. 4A shows the cross section of the lens denoted by lines 4A—4A in FIG. 4. FIG. 6 shows the cross section of the interface 154 between the lens 150 and the optical fibers.

As shown in FIG. 5, the lens 150 is mounted on a carrier 160 which moves inside housing 162. An actuator mechanism 170, such as a solenoid motor, moves the lens 150 back and forth in a single plane. The housing 162 constrains the total lateral movement of the lens to a distance of D1, which is equal to approximately 50% of a fiber diameter (see FIG. 2).

In other embodiments, an actuator could be used to move the fiber array relative to a fixed position lens 150.

Referring to FIG. 6, the fiber array 110 is positioned with respect to the lens 150 so that the movement of the GRIN lens 150 is parallel to the long side of the rectangular holder 120 which positions the fiber array. The lens 150 has two positions, one of which is shown in FIG. 6 and the other is shown in FIG. 7. The first position of the lens 150, shown in FIG. 6, places the axis 180 of the lens 150 in the middle of the four fibers L(in) 188, L(out) 186, Rx 156 and Tx 158, which carry signals to and from the switch. Light emanating from fiber L(in) 188 travels the length of the lens 150 and is reflected off the mirror 152 and back to the fiber labeled Rx 156. In like manner light emanating from fiber Tx 158 travels the length of the lens and is reflected off the mirror 152 and back to the fiber labeled L(out) 186. This configuration of the switch corresponds to the active state shown in FIG. 1A.

When the switch is moved into its second position, as shown in FIG. 7, the axis 180 of the lens 150 is on a line containing the centers of the middle two fibers 186 and 188 of the array and specifically it is located half way between the two fibers. Light emanating from fiber L(in) 188 travels the length of the lens 150 and is reflected off the mirror 152 and back to the fiber labeled L(out) 186. In like manner light emanating from fiber Tx 158 is reflected into the fiber labeled A 190, which is looped back to the array via the fiber labeled B 192. After light re-enters the lens 150 from fiber B 192, it again travels the length of the lens 150, reflects off the mirror 152 on the lens endface and back to the fiber labeled Rx 156. Thus fiber Tx 158 is coupled to fiber Rx 156. This configuration of the switch corresponds to the bypass state shown in FIG. 1B.

A prototype switch was fabricated using this arrangement and it was found to have the following losses:

| Switch Connection | State | |
| --- | --- | --- |
| | Active | Bypass |
| L(in) → Rx | 1.50 dB | |
| Tx → L(out) | 1.50 dB | |
| L(in) → L(out) | | 1.50 dB |
| Tx → Rx | | 2.50 dB |

Various actuators 170 were used and it was found that adequate response could be achieved with a simple solenoid driver.

FIG. 8 shows the switch when using the array 130, shown in FIG. 3A. In FIG. 8 the switch is in the bypass position. The axis of the lens 150 is on a line containing the centers of the middle two fibers 186 and 188 of the array 130 and specifically it is located half way between the two fibers. As in FIG. 7, fiber L(in) 188 is coupled to fiber L(out) 186. Light emanating from fiber Tx 158 travels the length of the lens 150 and is reflected off the mirror 152 and back to the upper portion X of the prism 140. Light entering the prism 140 at this point will be twice reflected off the back facets of the prism and then re-injected into the lens at the bottom portion Y of the prism. From there light leaving the prism 140 again travels the length of the lens 150, reflects off the mirror 152 on the lens endface and back to the fiber labeled Rx 156. Thus port Tx is coupled to port Rx.

The array 130 can be moved between two positions in the same way (such as the actuator arrangement shown in FIG. 5) as array 110. Thus a switch using array 130 also has an active position equivalent to the position of array 110 in FIG. 6. Note that the array 142 shown in FIGS. 3B-3D operates in the same manner as the array 130 shown in FIG. 3A. Only the method of forming the prism used in the two arrays differs.

A switch using array 130 or 142 from FIGS. 3A and 3B will, in general, have the same signal losses as the six fiber array switch when in the active state. When in the bypass state, the arrays 130 and 142 will have losses of up to 4 dB, which is somewhat greater than the loss when using the six fiber array 110.

The prism is not as efficient at transferring light back to the Rx fiber as the loop back fiber shown in FIG. 2, but it is simple and low cost. Moreover it is acceptable in most system applications for the light which is "looped back" from the local Tx port to the Rx port to be attenuated since this would happen normally in the actual transmission system.

Figure 9:
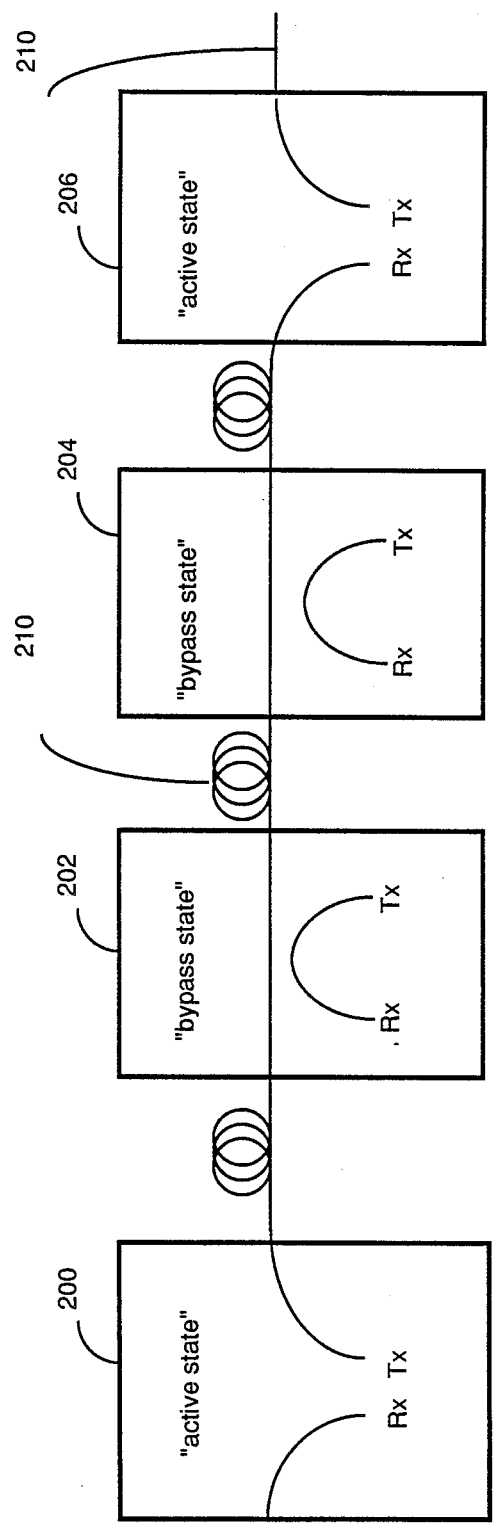
FIG. 9 schematically depicts a network using four optical switches in accordance with the present invention.

FIG. 9 shows a sequence of four switches, 200, 202, 204, 206 coupled to one another in sequence by optical fiber 210. Switches 200 and 206 are in the active position, meaning that they are positioned for coupling a node to the network. That is, the nodes coupled by switches 200 and 206 to the network can transmit signals onto the fiber 210. Switches 202 and 204 are in the bypass position, which means that the network bypasses the nodes coupled to these switches. In addition, the Rx ports of these switches are coupled to the corresponding Tx ports so that the nodes coupled to these switches can test their own operation by sending signals through the switch and back to themselves.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An optical fiber switch, comprising:
   an array of optical channels, including a set of four transmission elements having coplanar ends arranged in a square array, and an optical loop back element adjacent to said square array and having input and output regions coplanar with said ends of said transmission elements;
   a graded index of refraction lens having a mirrored end face which reflects light incident thereon and another end face abutting said coplanar ends of said four transmission elements;
   actuator means for holding and moving said lens between two predefined positions with respect to said array of optical channels;
   said lens, when in said first position, reflecting optical signals from a first one of said transmission elements to a second one of said transmission elements, and reflecting optical signals from a third one of said transmission elements to a fourth one of said transmission elements;
   said lens, when in said second position, reflecting optical signals from said first one of said transmission elements to said fourth one of said transmission elements, reflecting optical signals from said third one of said transmission elements to said input region of said loop back element, and reflecting optical signals from said output region of said loop back element to said second one of said transmission elements;
   whereby two distinct optical connections are made when said optical fiber switch is in said first and second positions.

2. The optical fiber switch of claim 1, wherein said loop back element comprises a single optical fiber loop having two ends coplanar with said ends of said set of four transmission elements.

3. The optical fiber switch of claim 1, said loop back element comprising a right angle prism.

4. The optical fiber switch of claim 1, wherein said loop back element comprises a right angle prism having two equal size mirrored faces and one longer face, said longer face being coplanar with said ends of said set of four transmission elements.

5. An optical fiber switch, comprising:
   an array of optical channels, including a set of four optical fibers having coplanar ends arranged in a square array, and loop back means adjacent to said square array and having a signal input region and a signal output region coplanar with said ends of said fibers; said loop back means including means for transmitting optical signals incident on said signal input region to said signal output region;
   a graded index of refraction lens having a nominal quarter pitch length and two end faces, one end face abutting said coplanar ends of said four optical fibers, the other end face having mirror means for reflecting light incident thereon; and
   actuator means for moving said lens between two predefined positions with respect to said array of optical channels;
   said lens, when in said first position, reflecting optical signals from a first one of said optical fibers to a second one of said optical fibers, and reflecting optical signals from a third one of said optical fibers to a fourth one of said optical fibers;
   said lens, when in said second position, reflecting optical signals from said first one of said optical fibers to said fourth one of said optical fibers, reflecting optical signals from said third one of said optical fibers to said signal input region of said loop back means, and reflecting optical signals from said signal output region of said loop back means to said second one of said optical fibers;
   whereby two distinct optical connections are made when said optical fiber switch is in said first and second positions.

6. The optical fiber switch of claim 5, wherein said loop back means comprises a single optical fiber loop having two ends coplanar with said ends of said set of four fibers.

7. The optical fiber switch of claim 5, said loop back means comprising a right angle prism.

8. The optical fiber switch of claim 5, wherein said loop back means comprises a right angle prism having two mirrored faces at right angles to one another and a third face, said third face being coplanar with said ends of said set of four fibers.

9. An optical fiber switch, comprising:
   four optical signal ports,
   an array of optical channels, including a set of four optical fibers coupled to said four optical signal ports, said four optical fibers having coplanar ends arranged in a square array; said array of optical channels further including loop back means adjacent to said square array and having two optical ports coplanar with said ends of said fibers; said loop back means including means for transmitting optical signals incident on one of said optical ports to the other of said optical ports;
   a lens having two end faces, one end face abutting said coplanar ends of said set of four fibers, the other end face having mirror means for reflecting light incident thereon; and
   actuator means for moving the lens between two predefined positions with respect to said array of optical channels;
   said lens, when in said first position, coupling first an second ones of said optical signal ports to third and fourth ones of said optical signal ports, respectively, by reflecting optical signals from the optical fibers coupled to said first and second ones of said optical signal ports to the optical fibers coupled to said third and fourth ones of said optical signal ports;

said lens, when in said second position, coupling said first and third ones of said optical signal ports to said second and fourth ones of said optical signal ports, respectively, by reflecting optical signals from the optical fiber coupled to said first optical signal port to the optical fiber coupled to said second optical signal port, reflecting optical signals from the optical fiber coupled to said third optical signal port to a first port of said loop back means, and reflecting optical signals from the second port of said loop back means to the optical fiber coupled to said fourth optical signal port;

whereby two distinct optical connections are made when said optical fiber switch is in said first and second positions.

10. The optical fiber switch of claim 9, wherein said loop back means comprises a single optical fiber loop having two ends coplanar with said ends of said set of four fibers.

11. The optical fiber switch of claim 9, said loop back means comprising a right angle prism.

12. The optical fiber switch of claim 9, wherein said loop back means comprises a right angle prism having two equal size mirrored faces and one long face, said long face being coplanar with said ends of said set of four fibers.

* * * * *